United States Patent
Faruque et al.

(10) Patent No.: US 12,233,763 B2
(45) Date of Patent: Feb. 25, 2025

(54) ENERGY ABSORBING DEVICE FOR VEHICLE SEAT

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/819,835

(22) Filed: Aug. 15, 2022

(65) Prior Publication Data

US 2024/0051441 A1    Feb. 15, 2024

(51) Int. Cl.
*B60N 2/427* (2006.01)
*B60N 2/07* (2006.01)
*B60N 2/08* (2006.01)

(52) U.S. Cl.
CPC ....... *B60N 2/42709* (2013.01); *B60N 2/0735* (2013.01); *B60N 2/0818* (2013.01)

(58) Field of Classification Search
CPC .. B60N 2/4214; B60N 2/4221; B60N 2/4228; B60N 2/42709; B60N 2/42718; B60N 2/0735; B60N 2/0812; B60N 2/0818; F16F 7/12; F16F 7/121
USPC ............. 297/216.18; 248/562, 636; 188/371, 188/377; 403/109.2, 109.3, 109.6
See application file for complete search history.

(56) References Cited

U.S. PATENT DOCUMENTS

| | | | | |
|---|---|---|---|---|
| 2,030,782 A | * | 2/1936 | Dennebaum | E01F 15/0438 256/13.1 |
| 2,238,523 A | * | 4/1941 | Holst | E01F 15/06 256/56 |
| 2,346,895 A | * | 4/1944 | Bergman | B64D 11/0649 297/216.18 |
| 4,645,375 A | * | 2/1987 | Carney, III | E01F 15/146 404/9 |
| 5,207,302 A | * | 5/1993 | Popp | E01F 7/045 188/372 |
| 5,685,603 A | * | 11/1997 | Lane, Jr. | B60N 2/286 297/252 |
| 6,216,995 B1 | * | 4/2001 | Koester | B60N 2/0825 297/344.1 |
| 7,658,359 B2 | * | 2/2010 | Jones | A47B 9/20 248/162.1 |

(Continued)

FOREIGN PATENT DOCUMENTS

DE        3424928 A1 *  1/1986  ........... B60N 2/4221
DE  102012218722 A1     4/2014

(Continued)

*Primary Examiner* — Daniel J Troy
*Assistant Examiner* — Guang H Guan
(74) *Attorney, Agent, or Firm* — Frank A. MacKenzie; Brooks Kushman P.C.

(57) ABSTRACT

An assembly includes a vehicle floor. The assembly includes a seat including a pedestal supported by the vehicle floor. The assembly includes a track supported by the vehicle floor. The pedestal is slidable along the track. The assembly includes an energy absorbing device supported by and slidable along the track. The energy absorbing device is between the track and the pedestal. The energy absorbing device is deformable relative to the track.

18 Claims, 6 Drawing Sheets

(56) References Cited

U.S. PATENT DOCUMENTS

| | | | | |
|---|---|---|---|---|
| 9,004,242 B2* | 4/2015 | Hodgson | ............... | F16F 1/37 |
| | | | | 267/136 |
| 10,150,392 B2* | 12/2018 | Mani | ............... | B60N 3/066 |
| 11,485,256 B2* | 11/2022 | Nakano | ............ | B60N 2/42709 |
| 11,541,830 B2* | 1/2023 | Jaradi | ............... | B60N 2/4249 |
| 11,685,297 B2* | 6/2023 | Huf | ............... | B60N 2/4214 |
| | | | | 296/68.1 |
| 12,151,595 B2* | 11/2024 | Amstein | ............ | B60N 2/0244 |
| 2020/0254907 A1 | 8/2020 | Nakano | | |
| 2023/0158924 A1* | 5/2023 | Amstein | ............... | B60N 2/067 |
| | | | | 248/429 |
| 2024/0051441 A1* | 2/2024 | Faruque | ............ | B60N 2/4214 |

FOREIGN PATENT DOCUMENTS

| | | | | | |
|---|---|---|---|---|---|
| JP | 761274 A | 3/1995 | | | |
| JP | 2015147527 A | 8/2015 | | | |
| WO | WO-9616834 A1 * | 6/1996 | ........... | B60N 2/2352 |
| WO | 2006068567 A1 | 6/2006 | | | |
| WO | WO-2009062505 A1 * | 5/2009 | ........... | B60N 2/2824 |
| WO | WO-2009108140 A1 * | 9/2009 | ........... | B60N 2/4214 |

* cited by examiner

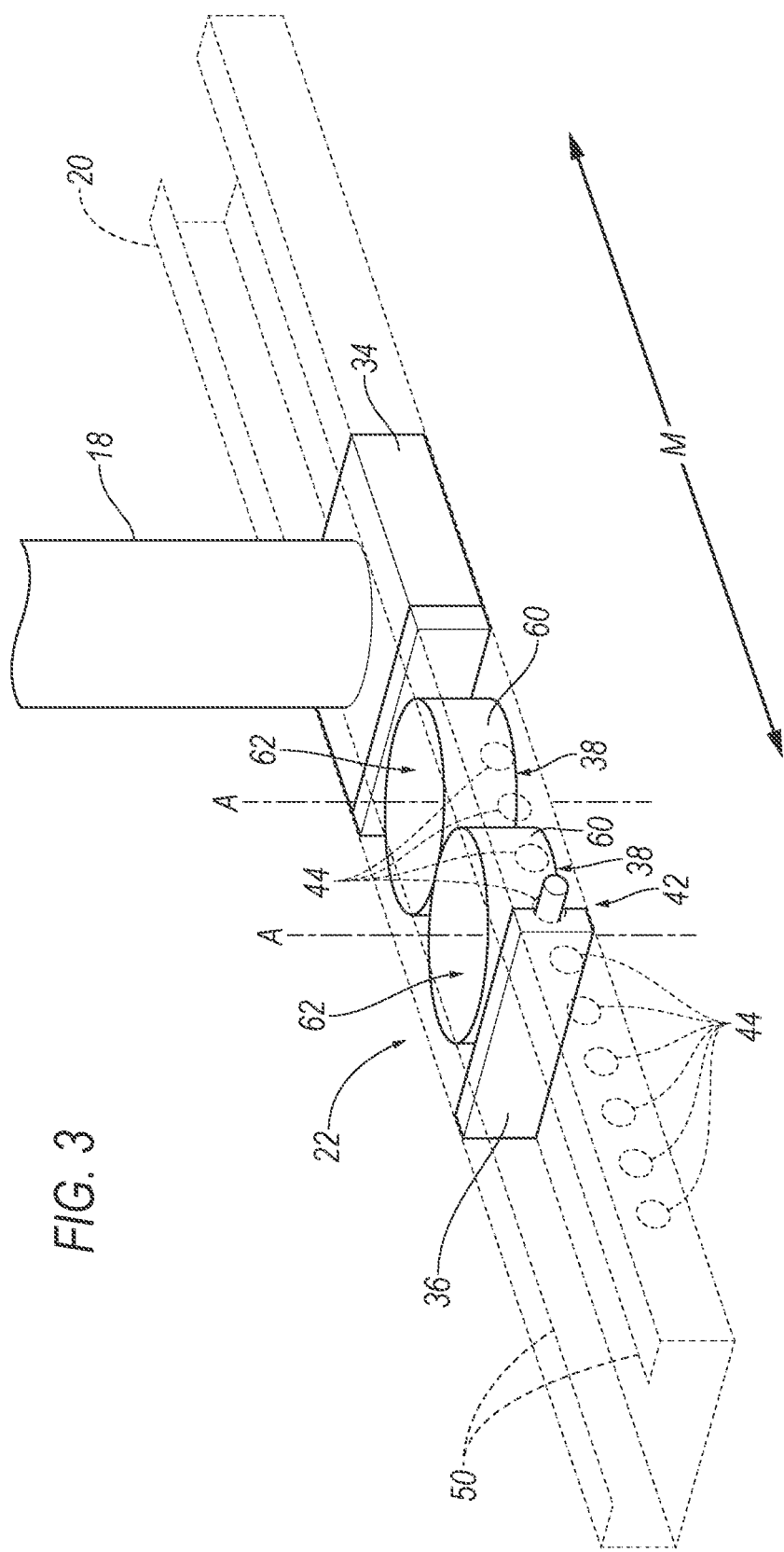

ENERGY ABSORBING DEVICE FOR VEHICLE SEAT

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

BRIEF DESCRIPTION OF THE DRAWINGS

FIG. 3 is a perspective view of the track and an energy absorbing device slidable along the track with the seat.

DETAILED DESCRIPTION

Figure 1:
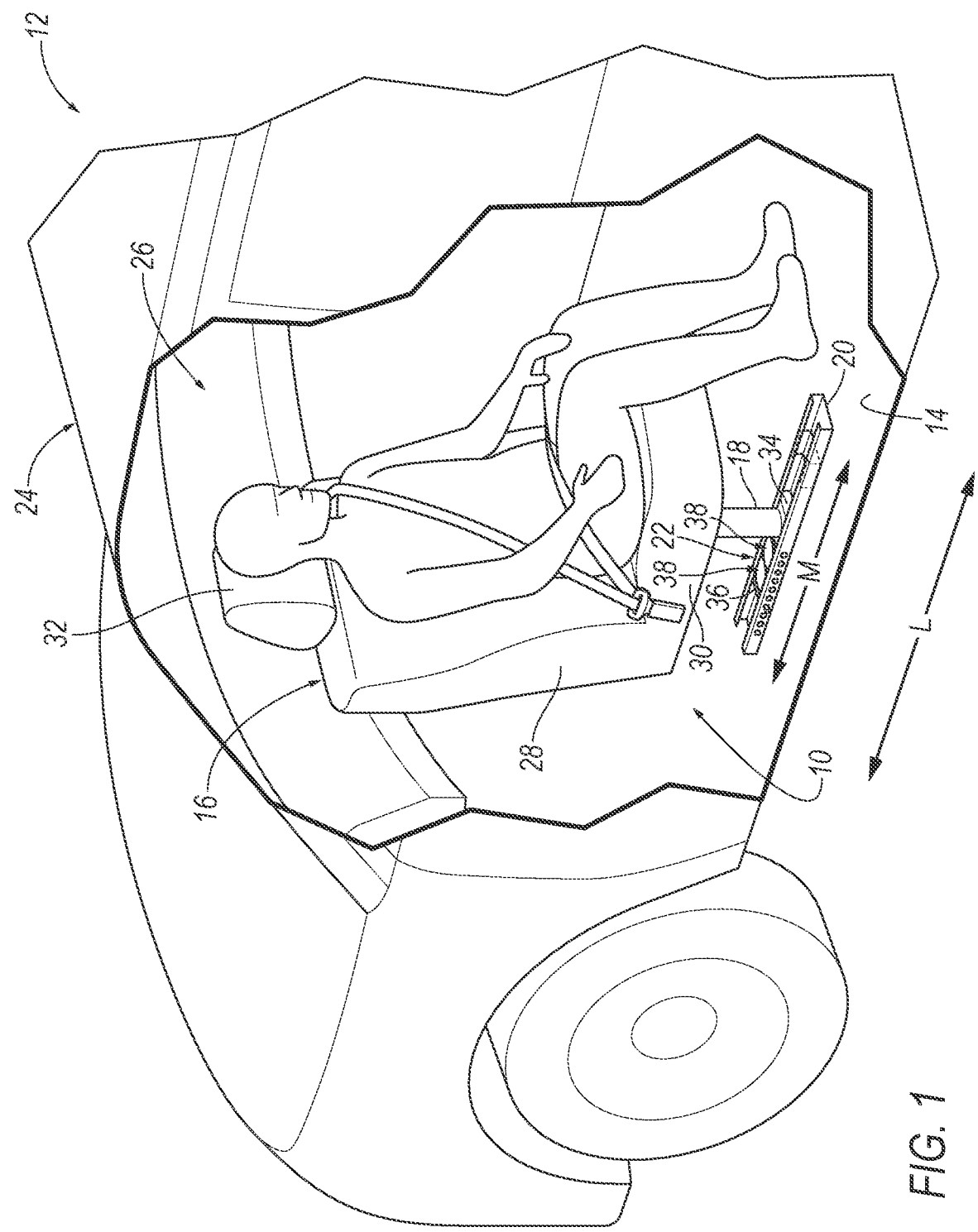
FIG. 1 is a forward perspective view of a vehicle having a seat slidable along a track.

An assembly includes a vehicle floor. The assembly includes a seat including a pedestal supported by the vehicle floor. The assembly includes a track supported by the vehicle floor. The pedestal is slidable along the track. The assembly includes an energy absorbing device supported by and slidable along the track. The energy absorbing device is between the track and the pedestal. The energy absorbing device is deformable relative to the track.

The pedestal and the energy absorbing device may be coupled to each other and slidable together along the track.

The energy absorbing device may include a deformable ring that is deformable relative to the track.

The deformable ring may be endless.

The deformable ring may extend in an arc from a first end to a second end, the first end of the deformable ring overlapping the second end of the deformable ring.

The energy absorbing device may include a second deformable ring, the second deformable ring abutting the deformable ring and the second deformable ring being deformable relative to the track.

One of the deformable ring or the second deformable ring may be endless and the other of the deformable ring or the second deformable ring extends in an arc from a first end to a second end, the first end overlapping the second end.

The deformable ring may abut the second deformable ring.

The track may define an axis of movement and the pedestal is moveable relative to the track along the axis of movement, the deformable ring being between the pedestal and the second deformable ring on the axis of movement.

The deformable ring may have a diameter and the track has a width, the diameter of the deformable ring being less than the width of the track.

The track may define an axis of movement and the pedestal is moveable relative to the track along the axis of movement, the energy absorbing device being elongated along the axis of movement.

The energy absorbing device may be elongated along the axis of movement in a seat-rearward direction.

The assembly may include a lock between the track and the energy absorbing device, the lock releasably engaging the track and the energy absorbing device with each other.

The assembly may include an end plate, the energy absorbing device being between the pedestal and the end plate.

The energy absorbing device may abut the end plate.

The energy absorbing device may be deformable relative to the end plate.

The assembly may include a lock fixed to the end plate and releasably engageable with the track.

The assembly may include track defines a hole, the lock being engageable with the hole.

With reference to the Figures, wherein like numerals indicate like parts throughout the several views, an assembly 10 for a vehicle 12 includes a vehicle floor 14. The assembly 10 includes a seat 16 including a pedestal 18 supported by the vehicle floor 14. The assembly 10 includes a track 20 supported by the vehicle floor 14. The pedestal 18 is slidable along the track 20. The assembly 10 includes an energy absorbing device 22 supported by and slidable along the track 20. The energy absorbing device 22 is between the track 20 and the pedestal 18. The energy absorbing device 22 is deformable relative to the track 20.

In the event of sudden deceleration of the vehicle 12, e.g., due to a frontal impact to the vehicle 12, the seat 16 may be urged by inertial forces toward the impact. When these inertial forces on the seat 16 exceed a threshold, the energy absorbing device 22 allows the seat 16 to move along the track 20 and absorbs energy from the seat 16 during this movement. The energy absorbing device 22 may slide along the track 20 with the pedestal 18 of the seat 16 such that the energy absorbing device 22 may absorb energy regardless of the position of the seat 16 along the track 20.

Figure 2:
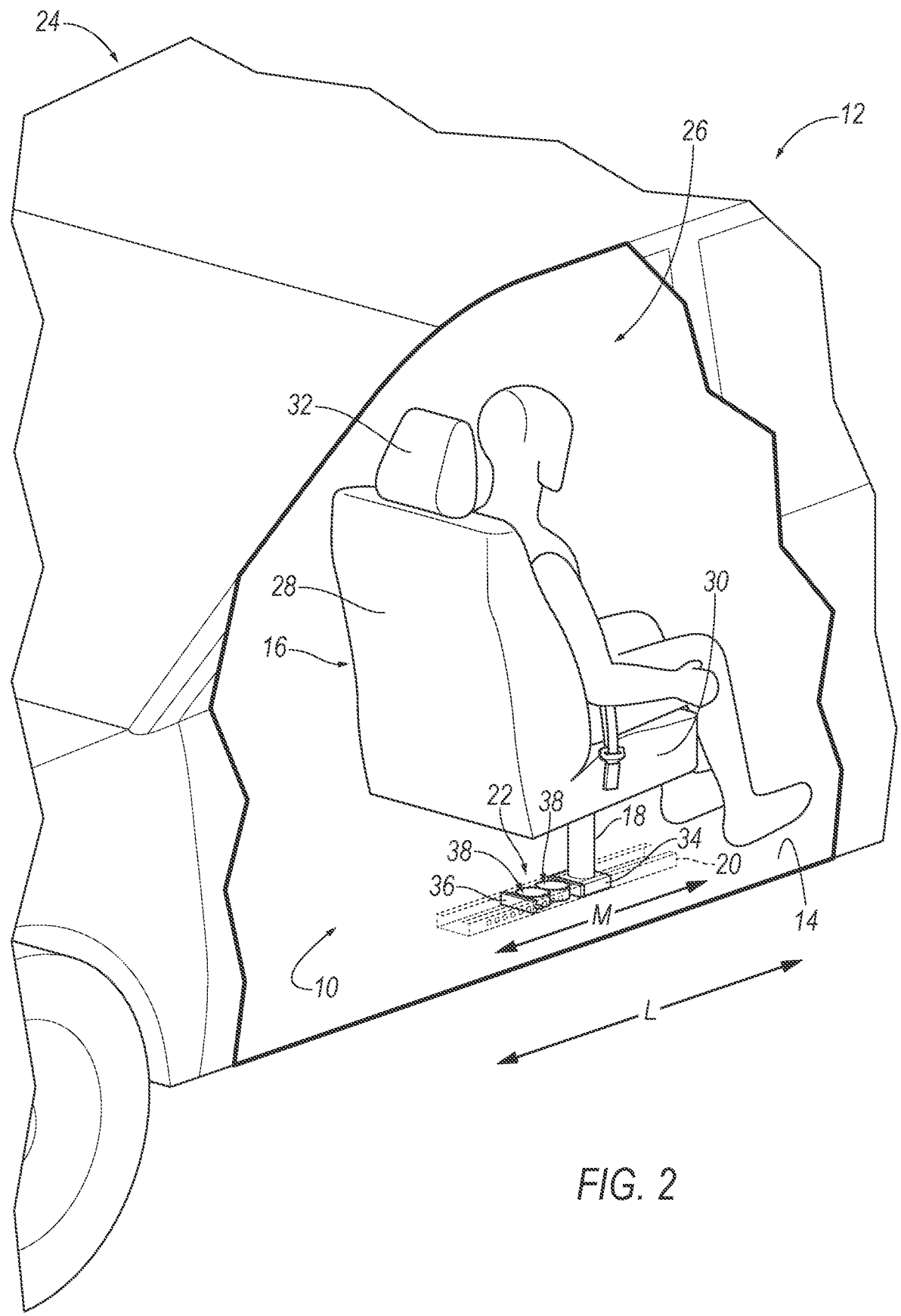
FIG. 2 is a rearward perspective view of the vehicle having the seat slidable along the track.

With reference to FIGS. 1 and 2, the vehicle 12 includes a body 24. The body 24 of the vehicle 12 defines a passenger compartment 26 to house occupants, if any, of the vehicle 12. The body 24 of the vehicle 12 includes the vehicle floor 14 disposed at the bottom of the passenger compartment 26 and a vehicle 12 roof spaced upwardly from the vehicle floor 14, i.e., the vehicle 12 roof is disposed at the top of the passenger compartment 26.

The passenger compartment 26 may house occupants, if any, of the vehicle 12. The passenger compartment 26 may extend across the vehicle 12, i.e., from one side to the other side of the vehicle 12. The passenger compartment 26 includes a front end and a rear end with the front end being in front of the rear end during forward movement of the vehicle 12.

The vehicle 12 includes one or more seats 16. The vehicle 12 may include any suitable number of seats 16. One seat 16 is shown in the example show in the Figures merely for illustration and the vehicle 12 may include any suitable number of seats 16. The seats 16 may be arranged in the passenger compartment 26 in any suitable position, i.e., as front seats 16, rear seats 16, third-row seats 16, etc. The seats 16 may be movable relative to the vehicle floor 14 to various positions, e.g., movable fore-and-aft and/or cross-vehicle. Specifically, the seat 16 is movable along the track 20, as described further below. The vehicle 12 may include any suitable number of tracks 20 and respective energy absorbing devices 22, e.g., one for each seat 16.

The seats 16 include a seatback 28, a seat bottom 30, and a head restraint 32. The head restraint 32 may be supported by and extending upwardly from the seatback 28. The head restraint 32 may be stationary or movable relative to the seatback 28. The seatback 28 may be supported by the seat bottom 30 and may be stationary or movable relative to the seat bottom 30. The seatback 28, the seat bottom 30, and the head restraint 32 may be adjustable in multiple degrees of freedom. Specifically, the seatback 28, the seat bottom 30, and the head restraint 32 may themselves be adjustable. In other words, adjustable components within the seatback 28, the seat bottom 30, and the head restraint 32 may be adjustable relative to each other.

With reference to FIG. 3, the seat 16 includes the pedestal 18 fixed to the seat bottom 30. The pedestal 18 is supported by the vehicle floor 14. Specifically, the pedestal 18 extends from the seat bottom 30 to a base 34 supported by the vehicle floor 14. The pedestal 18 may be fixed to the seat bottom 30 in any suitable way, e.g., welding, fasteners, etc. The base 34 includes an opening that receives the pedestal 18 of the seat 16. The base 34 may support the pedestal 18 of the seat 16. The pedestal 18 may extend from the base 34 to the seat bottom 30.

The vehicle 12 may include the track 20 supported by the vehicle floor 14. Specifically, the track 20 is fixed to the vehicle floor 14. In the example shown in FIGS. 1 and 2, the track 20 is elongated along a vehicle-longitudinal axis L, i.e., vehicle-forward to a vehicle-rearward direction. The track 20 may be fixed to the vehicle floor 14 in any suitable way, e.g., welding, fasteners, etc.

With reference to FIGS. 3-5B, the base 34 may be slidably attached to the track 20, i.e., the base 34 may slide relative to the vehicle floor 14 of the passenger compartment 26 along the track 20. Specifically, the pedestal 18 is slidable along the track 20. The pedestal 18 may be slidable along the track 20 to adjust the position of the seat 16 in the passenger compartment 26. In such an example, the base 34 and the seat 16 slide along the track 20 as a unit. In other words, as the base 34 slides along the track 20, the seat 16, including the pedestal 18, slides along the track 20. The track 20 defines an axis of movement M. In the examples in the Figures, the axis of movement M is elongated along the vehicle-longitudinal axis L. The pedestal 18 is moveable relative to the track 20 along the axis of movement M. In other words, the seat 16, including the pedestal 18, is moveable relative to the track 20 along the axis of movement M and the vehicle-longitudinal axis L.

Each seat 16 may rotate about an axis A that extends through the vehicle 12 roof and the vehicle floor 14. For example, the seats 16 may rotate between a forward-facing position and a rearward-facing position. In the forward-facing position, an occupant of the seat 16 faces the front end of the passenger compartment 26. In the rearward-facing position, an occupant of the seat 16 faces the rear end of the passenger compartment 26. The seats 16 may rotate completely, i.e., 360°, about the axis A. The seats 16 may rotate between fixed positions, e.g., the forward-facing position and the rearward-facing position, or may be rotatable to an infinite number of positions.

With reference to FIGS. 1-5B, the assembly 10 includes the energy absorbing device 22 supported by the track 20. The energy absorbing device 22 is between the track 20 and the pedestal 18 of the seat 16. In the event of an impact to the vehicle 12, specifically, a frontal impact to the vehicle 12 where the seat 16 may be in the rear-facing position, the seat 16 may suddenly move vehicle-forward along the track 20 due to force of the impact. The energy absorbing device 22 is deformable relative to the track 20 to absorb energy on the seat 16 from the impact due to inertia of the seat 16 and occupant of the seat 16. The deforming of the energy absorbing device 22 absorbs energy in the event of an impact to the vehicle 12.

As discussed above, the energy absorbing device 22 is between the track 20 and the seat 16. Specifically, the energy absorbing device 22 is between the pedestal 18 and the track 20. The energy absorbing device 22 may be between the base 34 and the track 20. The energy absorbing device 22 is slidable along the track 20 as the seat 16 slides along the track 20. In other words, the energy absorbing device 22 and the seat 16 are slidable along the track 20 as a unit. When the seat 16 is moved along the track 20, the energy absorbing device 22 and the seat 16 move together along the track 20, i.e., in the same direction and the same distance relative to the track 20.

The assembly 10 may include an end plate 36 supported by the track 20. The end plate 36 may be spaced from the base 34 of the seat 16 along the track 20, i.e., along the axis of movement M. The energy absorbing device 22 is between the pedestal 18, i.e., the base 34, and the end plate 36. In other words, the end plate 36 may be spaced from the end plate 36 by the energy absorbing device 22. The energy absorbing device 22 is elongated along the track 20. Specifically, the energy absorbing device 22 is elongated along the axis of movement M. The energy absorbing device 22 is elongated from the base 34 of the seat 16 to the end plate 36. The energy absorbing device 22 abuts the end plate 36 and the base 34 between the end plate 36 and the base 34. The energy absorbing device 22 is deformable relative to the end plate 36.

With reference to FIGS. 2-5B, the assembly 10 includes a lock 42 between the track 20 and the energy absorbing device 22. The lock 42 may retain the position of the seat 16 along the track 20 and the axis of movement M. The lock 42 may be fixed to the end plate 36 The lock 42 is releasably engageable with the track 20 and releasably engages the track 20 and the energy absorbing device 22 with each other to retain the position of the seat 16. The track 20 may define one or more holes 44 along the axis of movement M and the lock 42 may be engageable with the one or more holes 44. The holes 44 may be on either side of the track 20 or both sides of the track 20.

In some examples, the engaging and disengaging of the lock 42 relative to the track 20, may be automated (e.g., by electro-mechanical hardware such as switches, motors, and/or solenoids 46, etc.). In other examples the engaging and disengaging of the lock 42 relative to the track 20 may be manual (e.g., by mechanical hardware such as a lever). In the example of a solenoid 46, the solenoid 46 may include a post 48 insertable into the holes 44 of the track 20. The post 48 may move into and out of the hole 44 to engage and disengage the holes 44 of the track 20. When an occupant moves the seat 16, the lock 42 disengages with the track 20 to allow the seat 16, the energy absorbing device 22, and the end plate 36 to move along the track 20 and the axis of movement M.

As discussed above, the energy absorbing device 22 is deformable relative to the track 20 and the end plate 36. The energy absorbing device 22 may be deformable along the track 20 from an expanded position to a deformed position in the event of an impact to the vehicle 12. Specifically, the energy absorbing device 22 is deformable in any facing direction of the seat, e.g., when the seat 16 is in a rearward-facing position with the occupant of the seat 16 facing the rear end of the passenger compartment 26. The energy absorbing device 22 plastically deforms when deformed by movement of the pedestal 18 along the track 20. In other words, the energy absorbing device 22 is not resettable after an impact is experienced by the vehicle 12 that deforms the energy absorbing device 22. During normal operation of the vehicle 12, the energy absorbing device 22 is at the expanded position. In the expanded position, the end plate 36 is spaced from the base 34 by a first distance and the energy absorbing device 22 maintains the first distance in the absence of force of the magnitude of a vehicle impact. In the event of an impact, the seat 16 may move vehicle-forward and deform the energy absorbing device 22 to the deformed position. In the deformed position, the end plate 36 is spaced from the base 34 by a second distance. The second distance is shorter than the first distance.

The energy absorbing device 22 may include one or more deformable rings 38, 40. In examples including more than one deformable ring 38, 40, the deformable rings 38, 40 may be of the same type or different type and/or may have the same yield strength or a different yield strength. In examples including more than one deformable ring 38, 40 having different yield strengths, the deformable rings 38, 40, the combination of different yield strengths may provide progressive load absorption, as described below.

The deformable ring 38, 40 is deformable relative to the track 20 and the end plate 36. In other words, under forces associated with a vehicle impact, the track 20 and the end plate 36 move toward each other and deformable ring 38, 40 deforms therebetween. The energy absorbing device 22 is designed to be deformable under forces of the magnitude of a vehicle impact and rigid, i.e., not deformable, under forces lower than the magnitude of a vehicle impact. The deformability/rigidity of the energy absorbing device 22 may be designed with material selection, wall thickness, size, geometry, etc. of the energy absorbing device 22. The magnitude of force associated with vehicle impact may be known to those skilled in the art.

As described further below, the deformable rings 38, 40 may be endless or may be discontinuous. The deformable rings 38, 40 include a wall 60 elongated around a perimeter of the deformable rings 38, 40. The wall 60 surrounds an opening 62. In other words, the deformable rings 38, 40 may be hollow to allow the deformable rings 38, 40 to move from the expanded position to the deformed position. The opening 62 may change size and/or shape as the energy absorbing device 22 moves from the expanded position to the deformed position.

In the expanded positions, the deformable rings 38, 40 may be any suitable shape. For example, such as shown in the Figures, the deformable rings 38, 40 may have a circular shape. In other examples, the deformable rings 38, 40 may have an oval shape or a polygonal shape, e.g., a rectangular shape. In examples where the deformable rings 38, 40 have a polygonal shape, the deformable rings 38, 40 may have a rounded polygonal shape. In other words, the deformable rings 38, 40 may have a polygonal shape having vertices that are curved, i.e., rounded corners.

In the example shown in the Figures, the energy absorbing device 22 may include two deformable rings 38, 40 that are deformable relative to the track 20 and the end plate 36. In other examples, the energy absorbing device 22 may include more deformable rings 38, 40 than in the example shown in the Figures or fewer deformable rings 38, 40 than in the example shown in the Figures. In all examples, at least one of the deformable rings 38, 40 is adjacent the base 34 of the seat 16 and at least one of the deformable rings 38, 40 is adjacent the end plate 36. In the example shown in the Figures, one of the deformable rings 38, 40 is adjacent the base 34 of the seat 16 and the other of the deformable ring 38, 40 is adjacent the end plate 36. In such an example, one of the deformable rings 38, 40 is between the base 34, i.e., the pedestal 18, and the other of the deformable rings 38, 40 on the axis of movement M. In examples including only one deformable ring 38, 40, the deformable ring 38, 40 is adjacent the base 34 and the end plate 36. In examples including more than two deformable rings 38, 40, one deformable ring 38, 40 is adjacent the base 34 and one deformable ring 38, 40 is adjacent the end plate 36 with one or more deformable rings 38, 40 between the other deformable rings 38, 40.

In examples such as those in the Figures, or other examples with more than one deformable ring 38, 40, the rings may abut each other. In both the expanded position and the deformed position, the deformable rings 38, 40 abut each other. In other words, the deformable rings 38, 40 contact each other as the energy absorbing device 22 moves to the deformed position.

The deformable rings 38, 40 each have a diameter D and the track 20 has a width W. The diameter D of the deformable rings 38, 40 is less than the width W of the track 20 when the energy absorbing device 22 is in the expanded position. In other words, the deformable rings 38, 40 fit into the track 20 to slide along the track 20 and deform within the track 20 in the event of an impact to the vehicle 12. The track 20 may include a flange 50 on both side of the track 20 to retain the deformable rings 38, 40 in the track 20 both in the expanded position and the deformed position.

In some examples, one or more of the deformable rings 38, 40 may be endless (as shown for example with rings 38 in FIGS. 3-5B). In other words, the deformable rings 38, 40 extend in a continuous ring and have no end. In the example shown in the Figures, the deformable rings 38, 40 have an endless circular shape. In such an example, as the energy absorbing device 22 moves to the deformed position, the deformable ring 38, 40 may move from the endless circular shape to an endless oval shape. In other examples, one or more of the deformable rings 38, 40 may be discontinuous (as shown for example with ring 40 in FIGS. 4A-4B). In such an example, the deformable ring 38, 40 may extend in an arc from a first end 52 to a second end 54. In examples where the deformable rings 38, 40 are discontinuous, the first end 52 of the deformable ring 38, 40 overlaps the second end 54 of the deformable ring 38, 40. The first end 52 may be coiled about an axis A extending along the pedestal 18 to overlap the second end 54 of the deformable ring 38, 40. As the energy absorbing device 22 moves to the deformed position, the deformable ring 38, 40 may further coil about the axis A and a radius of the deformable ring 38, 40 become smaller. In either example where the deformable rings 38, 40 are endless or discontinuous, as discussed above, the deformable rings 38, 40 may be of any suitable shape, e.g., circular, oval, rectangular, rounded rectangular, etc.

Figure 4A:
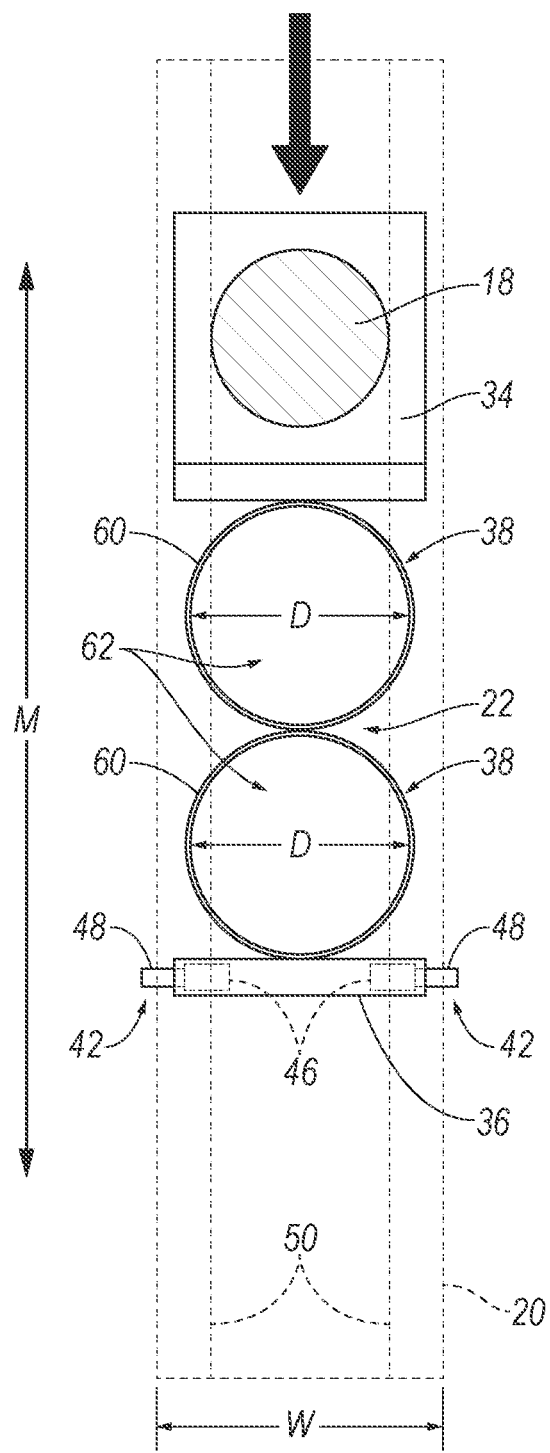
FIG. 4A is a plan view of the track and the energy absorbing device in an expanded position, the energy absorbing device including two deformable rings that are endless.
Figure 4B:
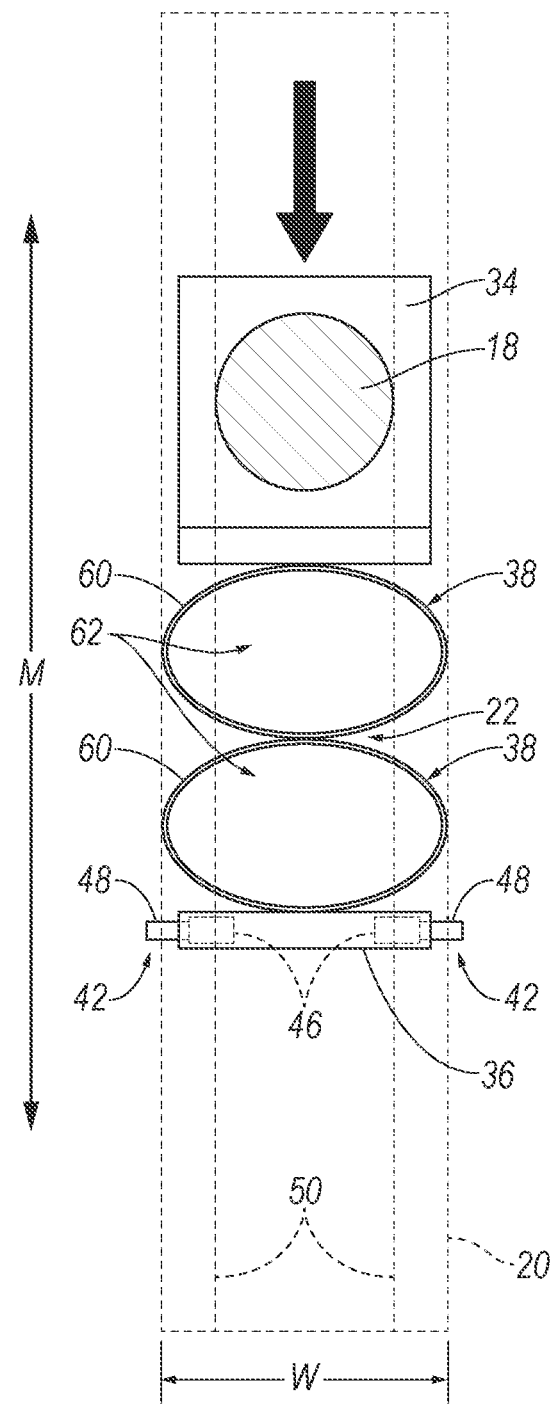
FIG. 4B is a plan view of the track and the energy absorbing device in a deformed position, the energy absorbing device including two deformable rings that are endless.
Figure 5A:
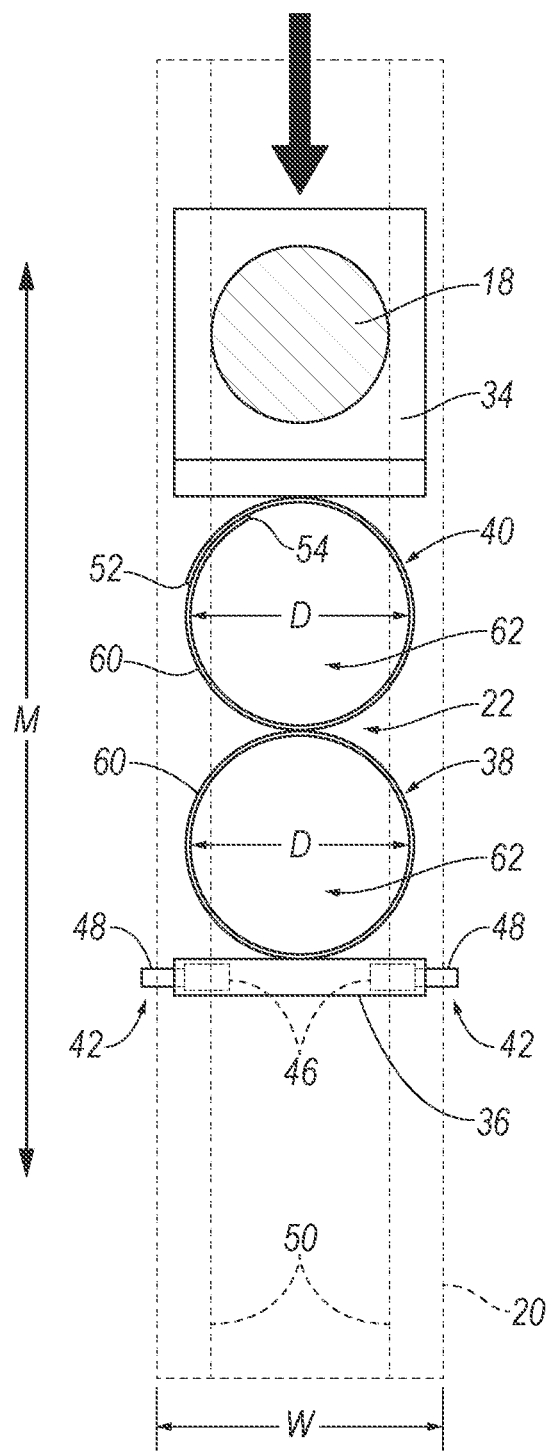
FIG. 5A is a plan view of the track and the energy absorbing device in an expanded position, the energy absorbing device including a deformable rings that are endless and a deformable ring that is discontinuous.
Figure 5B:
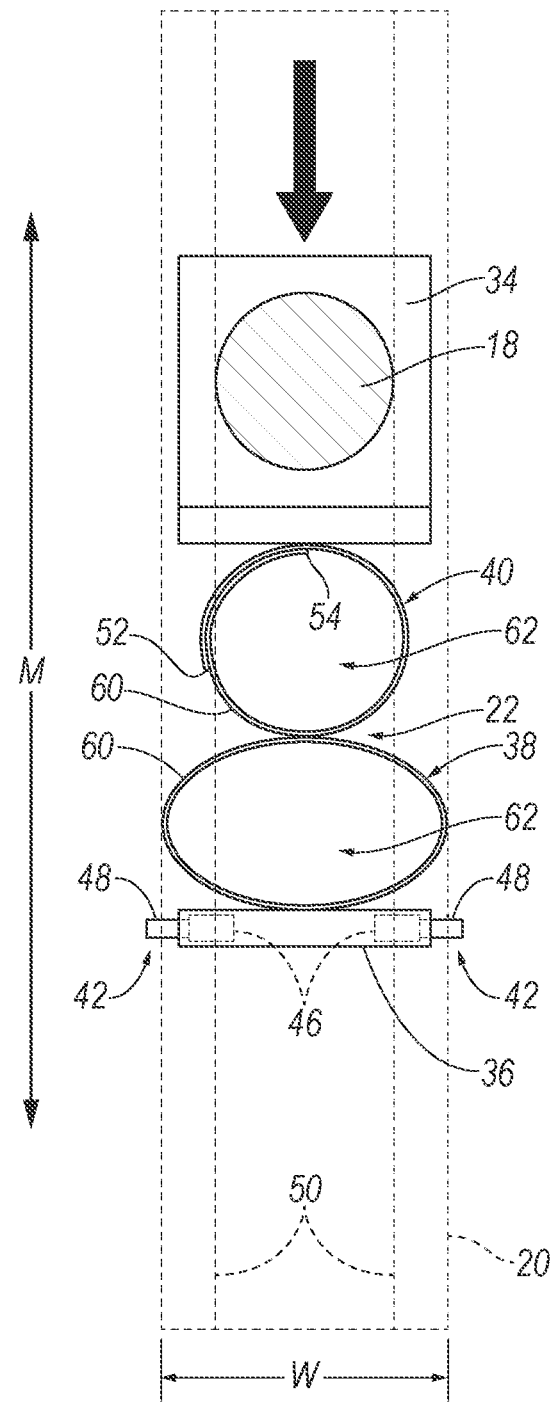
FIG. 5B is a plan view of the track and the energy absorbing device in a deformed position, the energy absorbing device including a deformable rings that are endless and a deformable ring that is discontinuous.

The energy absorbing device 22 may include any combination of deformable rings 38, 40. For example, such as shown in FIGS. 4A and 4B, the energy absorbing device 22 may include two deformable rings 38, 40 that are endless. In another example, such as shown FIGS. 5A and 5B, the energy absorbing device 22 may include one deformable ring 40 that is discontinuous and one deformable ring 38 that is endless. The energy absorbing device 22 may include any suitable combination of deformable rings 38, 40 to absorb energy in the event of an impact to the vehicle 12. In other words, the example shown in FIGS. 5A and 5B includes one continuous ring 38 and one discontinuous ring 40 and the example shown in FIGS. 4A and 4B includes all continuous rings 38. Other examples may include all discontinuous rings 40 or any combination of continuous rings 38 and discontinuous rings 40 in any suitable arrangement along the axis of movement M.

The deformable rings 38, 40 may be any suitable material or thickness to have suitable characteristics to absorb energy of the seat 16 in the event of an impact to the vehicle 12. For example, the deformable rings 38, 40 may be spring steel or a polymer material to absorb energy as the deformable rings 38, 40 deform. The deformable rings 38, 40 may be any suitable combination of materials, i.e., each deformable ring 38, 40 may be a different material. The deformable rings 38, 40 may each be any suitable thickness to absorb energy as the deformable rings 38, 40 deform. The deformable rings 38, 40 may be any combination of thicknesses or variable thicknesses to absorb energy.

In an example such as shown in the Figures, in the event of an impact to the vehicle 12 where the seat 16 is in the rearward-facing position, the vehicle 12 may experience sudden deceleration. In such an event, the seat 16 may suddenly move vehicle-forward along the axis of movement M. As the seat 16 suddenly moves vehicle-forward, the first deformable ring 38, 40 begins to deform as the energy absorbing device 22 moves to the deformed position along the axis of movement M. The deformation of the first deformable ring 38, 40 absorbs energy from the sudden deceleration of the vehicle 12. As the seat 16 continues to move along the axis of movement M due to the sudden deceleration of the vehicle 12, a second deformable ring 38, 40 deforms. Energy continues to be absorbed until both the first deformable ring 38, 40 and the second deformable ring 38, 40 are deformed and the energy absorbing device 22 reaches the deformed position.

Figure 6:
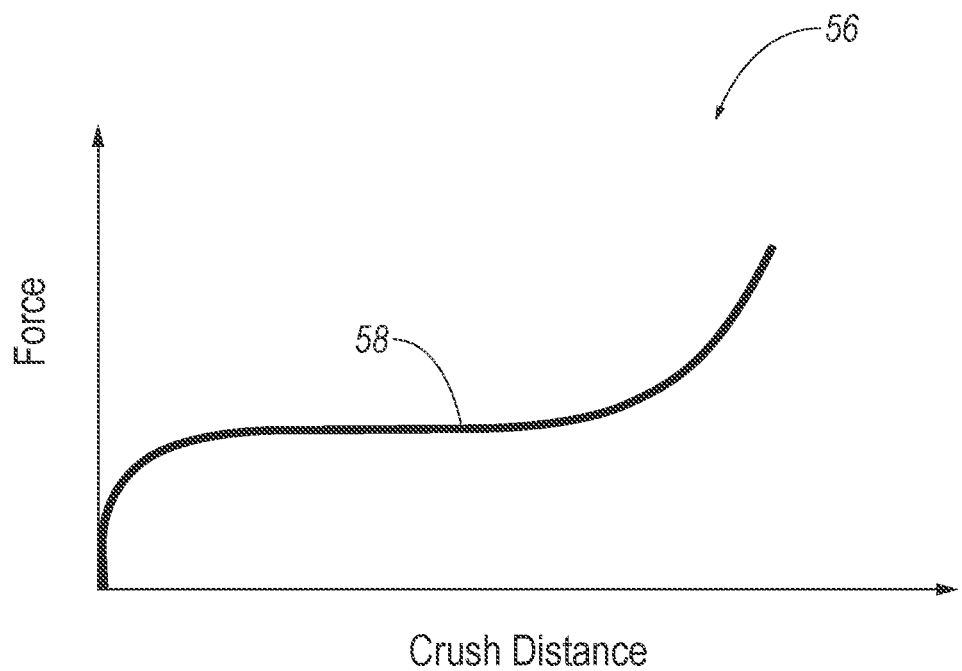
FIG. 6 is a graph of a simulation of a force versus deformation of the energy absorbing device.

FIG. 6 shows a curve 56 of a theoretical simulation of a force on the seat 16 in the event of an impact versus the distance of deformation, i.e., the distance moved along the axis of movement M. At the event of the impact, the curve 56 increases at a steep rate to a plateau portion 58 where the slope, i.e., the force, does not increase or decrease as the deformation of the energy absorbing device 22 increases. After the energy absorbing device 22 reaches the deformed position, the slope of the curve 56 may increase again.

The numerical adverbs "first" and "second" as used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle floor;
a seat including a pedestal supported by the vehicle floor;
a track supported by the vehicle floor, the pedestal being slidable along the track;
an end plate slidably disposed in the track and lockable relative to the track; and
an energy absorbing device slidably disposed in the track, the energy absorbing device being supported by and slidable in the track, the energy absorbing device being between the end plate and the pedestal;
the end plate, the energy absorbing device, and the pedestal being coupled to each other and slidable as a unit relative to the track; and
the energy absorbing device being deformable relative to the track.

2. The assembly of claim 1, wherein the energy absorbing device includes a deformable ring that is deformable relative to the track.

3. The assembly of claim 2, wherein the deformable ring is an endless ring.

4. The assembly of claim 2, wherein the deformable ring extends in an arc from a first end to a second end, the first end of the deformable ring overlapping the second end of the deformable ring.

5. The assembly of claim 2, wherein the energy absorbing device includes a second deformable ring, the second deformable ring abutting the deformable ring and the second deformable ring being deformable relative to the track.

6. The assembly of claim 5, wherein one of the deformable ring or the second deformable ring is an endless ring and the other of the deformable ring or the second deformable ring extends in an arc from a first end to a second end, the first end overlapping the second end.

7. The assembly of claim 5, wherein the track defines an axis of movement and the pedestal is moveable relative to the track along the axis of movement, the deformable ring being between the pedestal and the second deformable ring on the axis of movement.

8. The assembly of claim 2, wherein the deformable ring has a diameter and the track has a width, the diameter of the deformable ring being less than the width of the track.

9. The assembly of claim 1, wherein the track defines an axis of movement and the pedestal is moveable relative to the track along the axis of movement, the energy absorbing device being elongated along the axis of movement.

10. The assembly of claim 9, wherein the energy absorbing device is elongated along the axis of movement in a seat-rearward direction.

11. The assembly of claim 1, further comprising a lock between the track and the end plate, the lock releasably engaging the track and the end plate with each other.

12. The assembly of claim 1, wherein the energy absorbing device abuts the end plate.

13. The assembly of claim 1, wherein the energy absorbing device is deformable relative to the end plate.

14. The assembly of claim 1, further comprising a lock fixed to the end plate and releasably engageable with the track.

15. The assembly of claim 14, wherein the track defines a hole, the lock being engageable with the hole.

16. An assembly comprising:
a vehicle floor;
a seat including a pedestal supported by the vehicle floor;
a track supported by the vehicle floor, the pedestal being slidable along the track;

an end plate slidably disposed in the track and lockable relative to the track; and a deformable ring slidably disposed in the track between the pedestal and the end plate;

the end plate, the deformable ring, and the pedestal being coupled to each other and slidable as a unit relative to the track; and the deformable ring being plastically deformable relative to the end plate and the pedestal.

17. The assembly of claim 16, further comprising a lock fixed to the end plate and releasably engageable with the track, the end plate being slidable along the track when the lock is disengaged from the track, the lock retaining a position of the end plate along the track when the lock is engaged with the track.

18. The assembly of claim 17, wherein the track defines a plurality of holes spaced along the track, the lock being selectively releasably engageable with at least one of the holes.

\* \* \* \* \*